US012050635B2

(12) United States Patent
Tekin et al.

(10) Patent No.: US 12,050,635 B2
(45) Date of Patent: Jul. 30, 2024

(54) SYSTEMS AND METHODS FOR UNSTRUCTURED DATA PROCESSING

(71) Applicant: American Family Mutual Insurance Company, S.I., Madison, WI (US)

(72) Inventors: Ender Tekin, Madison, WI (US); Thomas Kneubuehl, Madison, WI (US); Glenn M. Fung Moo, Madison, WI (US); Qian You, Burien, WA (US); Devin M. Conathan, Madison, WI (US)

(73) Assignee: American Family Mutual Insurance Company, S.I., Madison, WI (US)

( * ) Notice: Subject to any disclaimer, the term of this patent is extended or adjusted under 35 U.S.C. 154(b) by 133 days.

(21) Appl. No.: 17/946,758

(22) Filed: Sep. 16, 2022

(65) Prior Publication Data

US 2023/0092559 A1    Mar. 23, 2023

Related U.S. Application Data

(60) Provisional application No. 63/245,619, filed on Sep. 17, 2021.

(51) Int. Cl.
*G06F 16/34* (2019.01)
*G06Q 40/08* (2012.01)
*G06V 30/412* (2022.01)

(52) U.S. Cl.
CPC ............. *G06F 16/34* (2019.01); *G06Q 40/08* (2013.01); *G06V 30/412* (2022.01)

(58) Field of Classification Search
CPC ...... G06F 16/958; G06Q 20/04; G06Q 20/32; G06Q 10/10; H04L 67/02
See application file for complete search history.

(56) References Cited

U.S. PATENT DOCUMENTS 6,233,545 B1    5/2001  Datig
6,292,792 B1    9/2001  Baffes et al.
(Continued)

FOREIGN PATENT DOCUMENTS

WO    2008130501    10/2008
WO    2018209254    11/2018

OTHER PUBLICATIONS

Berant et al., "Semantic Parsing on Freebase from Question-Answer Pairs," Proceedings of the 2013 Conference on Empirical Methods in Natural Language Processing, pp. 1533-1544.
(Continued)

*Primary Examiner* — Scott S Trotter
(74) *Attorney, Agent, or Firm* — Fitch, Even, Tabin & Flannery LLP

(57) ABSTRACT

Provided herein are systems and methods for processing unstructured data for insurance pricing. In particular, the data processing systems and methods provided herein may be useful to price simulation for the optimization of insurance pricing. The data processing systems and methods use machine learning algorithms to automatically detect relevant rate factor tables in unstructured data sources, such as regulatory filing documents. The machine learning algorithms then extract rate factor data from the tables and place extracted rate factor data in a structured form, eliminating or reducing the need for manual structured data extraction. In some embodiments, the data processing systems and methods also include an audit interface for receiving one or more changes to the structured rate factor data. In the manner, the audit interface may be used to validate the structured rate factor data obtained via the methods described herein.

22 Claims, 10 Drawing Sheets

(56) References Cited

U.S. PATENT DOCUMENTS

| | | | |
|---|---|---|---|
| 9,183,593 | B2 | 11/2015 | Willis |
| 9,189,742 | B2 | 11/2015 | London |
| 10,108,700 | B2 | 10/2018 | Gupta et al. |
| 10,496,754 | B1 | 12/2019 | Ferrucci et al. |
| 10,664,572 | B2 | 5/2020 | Bitran |
| 10,885,591 | B1 | 1/2021 | Bischoff |
| 11,782,928 | B2 * | 10/2023 | Chan ............... G06N 3/045 707/769 |
| 2010/0131300 | A1 | 5/2010 | Collopy |
| 2016/0224637 | A1 | 8/2016 | Sukumar et al. |
| 2016/0239919 | A1 | 8/2016 | Eder |
| 2017/0230312 | A1 | 8/2017 | Barrett et al. |
| 2017/0329867 | A1 | 11/2017 | Lindsley |
| 2018/0052884 | A1 | 2/2018 | Kale et al. |
| 2018/0232658 | A1 | 8/2018 | Acharya |
| 2018/0315415 | A1 | 11/2018 | Mosley et al. |
| 2018/0330281 | A1 | 11/2018 | Teller |
| 2018/0336640 | A1 | 11/2018 | Dziabiak |
| 2018/0349511 | A1 | 12/2018 | Kleiman-Weiner et al. |
| 2019/0042988 | A1 | 2/2019 | Brown et al. |
| 2019/0080416 | A1 | 3/2019 | Smith |
| 2019/0236140 | A1 | 8/2019 | Canim et al. |
| 2020/0058381 | A1 | 2/2020 | Patel |
| 2020/0342221 | A1 | 10/2020 | Sampath |
| 2020/0357075 | A1 | 11/2020 | Dahl |
| 2021/0201169 | A1 * | 7/2021 | Fung Moo ............. G06Q 40/08 |

OTHER PUBLICATIONS

Bockhorst et al., "Knowledge Graph-Driven Conversational Agents," 33rd Conference on Neural Information Processing Systems, 2019 (12 pages).

Bockhorst et al., "Probabilistic-Logic Bots for Efficient Evaluation of Business Rules Using Conversational Interfaces," The Thirty-First AAAI Conference on Innovative Applications of Artificial Intelligence (IAAI-19), Jan. 2019, pp. 9422-9427.

Eckert et al., "How digitalization affects insurance companies: overview and use cases of digital technologies," Die Zeitschrift für die gesamte Versicherungswissenschaft, 2020, vol. 109, pp. 333-360.

Einolghozati et al., "Improving Semantic Parsing for Task Oriented Dialog," 32nd Conference on Neural Information Processing Systems, 2018 (9 pages).

Gupta et al., "Semantic Parsing for Task Oriented Dialog using Hierarchical Representations," Proceedings of the 2018 Conference on Empirical Methods in Natural Language Processing, pp. 2787-2792.

Hannun et al., "Deep Speech: Scaling up end-to-end speech recognition," Dec. 19, 2014 (12 pages).

Iyyer et al., "Search-based Neural Structured Learning for Sequential Question Answering," Proceedings of the 55th Annual Meeting of the Association for Computational Linguistics, 2017, pp. 1821-1831.

Kim, "Convolutional Neural Networks for Sentence Classification," Sep. 3, 2014 (6 pages).

Leu et al., "A Multi-Disciplinary Review of Knowledge Acquisition Methods: From Human to Autonomous Eliciting Agents," 2018 (25 pages).

Mozilla. 2019, A tensorflow implementation of baidu's deepspeech architecture, https://github.com/mozilla/DeepSpeech, accessed on Jan. 29, 2021.

Pennington et al., "GloVe: Global Vectors forWord Representation," Proceedings of the 2014 Conference on Empirical Methods in Natural Language Processing (EMNLP), pp. 1532-1543.

Snidaro et al., "Recent Trends in Context Exploitation for Information Fusion and AI," AI Magazine, vol. 40, No. 3, 2019 (18 pages).

Sun et al., "Knowledge-Aware Conversational Semantic Parsing Over Web Tables," Sep. 12, 2018 (9 pages).

Wang et al., "Building a Semantic Parser Overnight," Proceedings of the 53rd Annual Meeting of the Association for Computational Linguistics and the 7th International Joint Conference on Natural Language Processing, 2015, pp. 1332-1342.

Yao et al., "Interactive Semantic Parsing for If-Then Recipes via Hierarchical Reinforcement Learning," The Thirty-Third AAAI Conference on Artificial Intelligence (AAAI-19), Jul. 17, 2019, pp. 2547-2554.

Zappa et al., "Text Mining In Insurance: From Unstructured Data To Meaning," 2019 (30 pages).

\* cited by examiner

FIG. 9

SYSTEMS AND METHODS FOR UNSTRUCTURED DATA PROCESSING

CROSS-REFERENCE TO RELATED APPLICATION(S)

This application claims the benefit of U.S. Provisional Application No. 63/245,619, filed Sep. 17, 2021, which is incorporated herein by reference in its entirety.

TECHNICAL FIELD

This invention relates generally to processing data and, in particular, processing unstructured data such as unstructured documents.

BACKGROUND

While the Internet provides companies, such as banks and insurance providers, with vast troves of potentially useful information, efficiently and effectively processing relevant portions of this data remains an ongoing effort, especially as additional sources of information become available over time. For example, insurance companies typically use a number of factors to set pricing, such factors may be referred to as rate factors. In some instances, insurance companies submit insurance rate filing documents to report their rate factors to state departments of insurance. State departments of insurance may provide public access to rate filing documents filed by insurance companies. However, such rate filing documents are typically unstructured.

Due to the unstructured format, extracting information from rate filing documents often involves manually searching and manually extracting rate factor information from the unstructured documents. Such a manual approach may be labor intensive and provides limited operational scalability. Due to limited scalability, it may be cost prohibitive and time consuming to access rate filing documents from a variety of markets. Further, a time-consuming manual extraction process may also leave limited time for analysis of information housed within unstructured rate filing documents.

BRIEF DESCRIPTION OF THE DRAWINGS

FIG. 9 illustrates an exemplary user interface of the data processing system of FIG. 1, in accordance with some embodiments.

Figure 1:
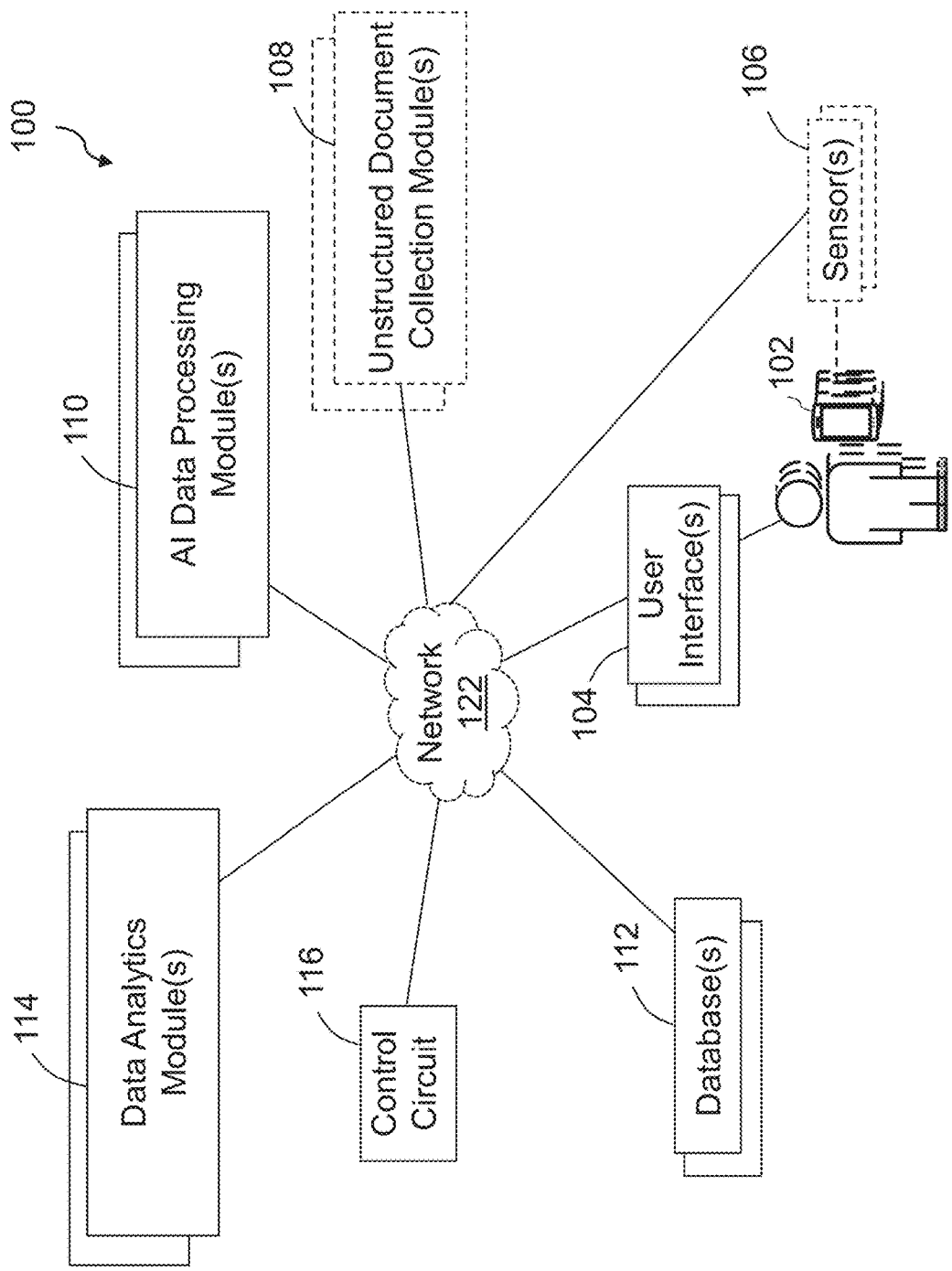
FIG. 1 is a schematic diagram of a data processing system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Provided herein are systems and methods for processing unstructured data for insurance pricing. In particular, the data processing systems and methods provided herein may be useful to price simulation for the optimization of insurance pricing. It is contemplated, however, that the data processing systems and methods described herein may be used in a variety of insurance-related tasks or processes. The data processing systems and methods use machine learning algorithms to automatically detect relevant rate factor tables in unstructured data sources, such as publicly available regulatory filings from insurance companies, as well as tier filings from underwriting companies. The machine learning algorithms then extract rate factor data from the tables and place the extracted rate factor data in a structured format, eliminating or reducing the need for manual structured data extraction. In this manner, the data processing systems and methods provide a scalable process that may be used to efficiently extract structured rate factor data and enables high-volume data processing as compared to manual extraction methods.

The data processing systems and methods may, therefore, be employed to quickly and cost-effectively extract rate factor data from various source documents across a number of markets, companies, etc. Accordingly, the automated process employed in the data processing systems and methods described herein may facilitate benchmarking and improve market knowledge. Further, the data processing systems and methods allow a quick understanding of the effects of rate changes across the industry, reducing time-delay between when insurance companies submit publicly availably regulatory filings with updated rate factors and when a particular company is able to react to such changes.

In one example, if a company plans to expand to one or more new states, the data processing systems and methods described herein may be employed to gather intelligence on rates and market pricing so that the company can benchmark against industry standards.

In some approaches, the extracted structured rate factor data may be used to calculate one or more competitive indices to compare a particular company's pricing to other markets or insurance providers. In this manner, the data processing systems and methods may allow a particular company to assess its pricing relative to other insurance providers and to promptly adapt to market conditions. The competitive indices may also be useful for marketing (for example, to allocate capital for better marketing results) and/or to focus sales efforts.

In some aspects, the extracted structured rate factor data may be housed in one or more databases and queried and/or accessed by one or more Application Programing Interfaces (APIs). Such APIs may incorporate the structured rate factor data into various workflows. It is contemplated that the one or more databases may provide enterprise-wide access to the extracted structured rate factor data to allow access to the extracted structured rate factor data across various business units.

While the data processing systems and methods are described herein as performing unstructured data processing, it is also contemplated that the data processing systems and methods may also process semi-structured data or a combination of unstructured and semi-structured data.

Further, while certain data processing systems and methods are described herein as processing unstructured rate filing documents, it is contemplated that the systems and methods described herein may also be employed to process other types of unstructured documents. For example, the data processing systems and methods described herein may also be leveraged to process unstructured documents housing, for example, underwriting tier tables. In this manner, the systems and methods described here in may be used to detect underwriting tier tables in such unstructured documents, extract underwriting tier data from the tables, and place the extracted underwriting tier data into a structured form.

FIG. 1 illustrates a data processing system 100 in accordance with some embodiments. In some approaches, the data processing system 100 may be used to identify at least one table in an unstructured document. The data processing method may further be used to extract data from the at least one table and place the extracted data into a structured form. It is contemplated that the data processing system 100 may execute one or more of the methods described herein, or any portion thereof.

The data processing system 100 includes one or more electronic user devices 102, one or more databases 112, and a control circuit 116. The data processing system 100 also includes various modules to facilitate the collection and processing of unstructured data. The modules include one or more of an unstructured document collection module 108, an artificial intelligence (AI) data processing module 110, and a data analytics module 114.

The one or more electronic user devices 102 may include, for example, personal computers, smart phones, laptops, tablets, smart watches, or any other suitable electronic device. One or more user interfaces 104 are associated with the electronic user device(s) 102. The user interface(s) 104 may be configured to receive and display graphical user interfaces, images, reports, instructions, notifications, or any other data extracted or otherwise generated or received by the system 100.

The electronic user devices 102 may also optionally include or be communicatively coupled to one or more sensors 106. In some embodiments, the sensor(s) 106 are optical sensors but it is contemplated that the sensors may be any sensors configured to capture an image. In one example, the sensor(s) 106 may be employed to capture an image of an unstructured or semi-structured document and to transmit that image to system 100. In some approaches, the sensor(s) 106 may be configured to transmit an image to the electronic user devices 102, which may display the image via the user interface(s) 104.

The data processing system 100 optionally includes one or more unstructured document collection modules 108. The unstructured document collection module(s) 108 may be configured to automatically retrieve one or more unstructured documents to be analyzed by the data processing system 100. In some approaches, the unstructured document collection module(s) 108 may be configured to automatically access at least one webpage and download at least one unstructured rate filing document from the at least one webpage.

The one or more AI data processing modules 110 are configured to receive unstructured data. In some approaches, the AI data processing module(s) 110 receives unstructured data from the unstructured document collection module(s) 108 and/or from the sensor(s) 106. In other approaches, the AI data processing module(s) 110 receives unstructured data from the user interface(s) 104. For example, a user may upload one or more unstructured documents to the AI data processing module 110 via the user interface(s) 104. Unstructured data may refer to data or information that is not organized in a clearly defined framework, such portable document format (PDF) files, including scanned or digitally created PDF files. It is also contemplated that unstructured data may include text files, sensor data, images, video files, audio files, emails, social media data, and or server, website, or application logs. Rate filing documents, such as publicly available regulatory filings filed with a Department of Insurance by an insurance company, may include one or more tables containing rate factor data. Similarly, underwriting companies' public filings may include their tables. Both of these filings fall into this category of unstructured data. By contrast, structured data may refer to data or information stored in a structured framework of columns and rows relating to a pre-defined data model. In addition, data may exist in a semi-structured format such as extensible markup language (XML), JavaScript object notation (JSON), or comma-separated value (CSV) documents or images; which improves cataloging and searching data, while still being limited in speed or ease of access. In some aspects, the unstructured data is in the form of rate filing documents including, such as publicly available regulatory filings filed with a Department of Insurance by an insurance company.

It is contemplated that an unstructured document may include a plurality of pages. Further, the systems and methods described herein may be configured to process the plurality of pages in a parallel fashion.

The AI data processing module(s) 110 include one or more machine learning algorithms. The one or more machine learning algorithms are configured to receive a plurality of unstructured documents and to extract data from the plurality of unstructured documents. In some approaches, the machine learning algorithm(s) are configured to detect at least one table in the plurality of unstructured documents. The machine learning algorithm(s) then extract data from the at least one table and place the extracted data into structured form. In some aspects, the extracted data is rate factor data that is extracted from unstructured rate filing documents. In some embodiments, the machine learning algorithm(s) are further configured to extract metadata from one or more unstructured documents.

In some embodiments, the AI data processing module(s) 110 also include one or more audit interfaces. The audit interface is configured to display the structured data and to receive at least one change to the structured data. The audit interface may also be configured to display the original unstructured data. In some approaches, the audit interface displays and/or receives data (e.g., the at least one change to the structured data) via the user interface(s) 104. An exemplary audit interface is displayed in FIG. 9.

Figure 3:
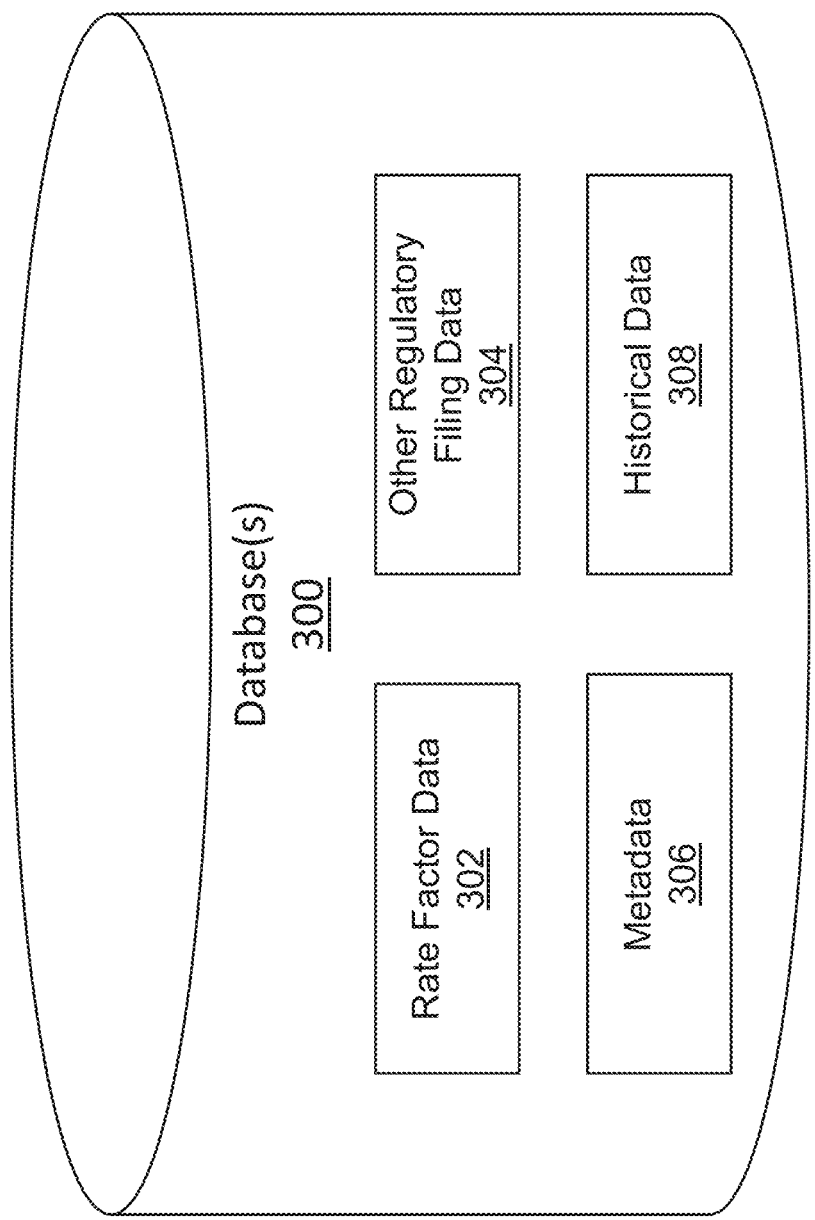
FIG. 3 is a schematic diagram illustrating an exemplary database structure for the data processing system of FIG. 1, in accordance with some embodiments.

The one or more databases 112 may include any suitable database structure for housing the structured data that is obtained using the AI data processing module(s) 110. In some embodiments, the databases 112 may house structured rate factor data, metadata, and/or other filing data obtained using or otherwise extracted by the AI data processing modules 110. FIG. 3 illustrates an exemplary structure for the databases 112.

The one or more data analytics modules 114 are configured to further process the structured data obtained using the AI data processing module(s) 110. In some approaches, the data analytics module(s) 114 include one or more APIs that receive the structured data that is obtained using the AI data procession module(s) 110. The APIs may be configured to process or otherwise utilize the structured data in various workflows. In some aspects, when the structured data is structured rate factor data, the APIs may relate to at least one of pricing and/or rating, marketing and/or sales, and management and/or strategy for an insurance company.

The control circuit 116 is in communication with the other system components. That is, the control circuit 116 is in communication with the one or more electronic user devices 102, the one or more unstructured document collection modules 108, the one or more AI data processing modules 110, the one or more databases 112, and the one or more data analytics modules 114 of FIG. 1. The term control circuit refers broadly to any microcontroller, computer, or processor-based device with processor, memory, and programmable input/output peripherals, which is generally designed to govern the operation of other components and devices. It is further understood to include common accompanying accessory devices, including one or more memories transceivers for communication with other components and devices, etc. These architectural options are well known and understood in the art and require no further description here. The control circuit 116 may be configured (for example, by using corresponding programming stored in a memory as will be well understood by those skilled in the art) to carry out one or more of the steps, actions, and/or functions described herein.

As illustrated in FIG. 1, the various components of the data processing system 100 may communicate directly or indirectly, such as over one or more distributed communication networks, such as network 122. For example, the network 122 may include LAN, WAN, Internet, cellular, Wi-Fi, and other such communication networks or combinations of two or more such networks.

Figure 2:
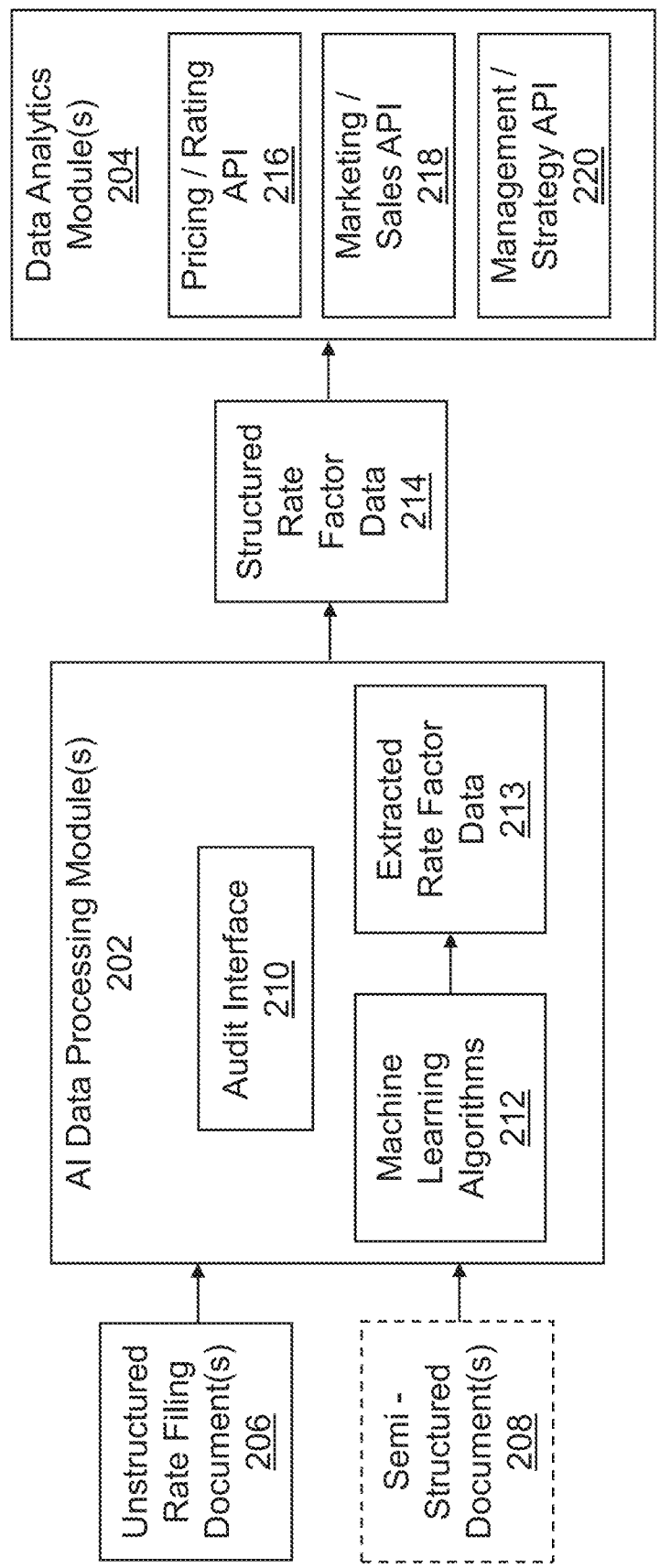
FIG. 2 includes schematic diagrams of modules in the data processing system of FIG. 1, in accordance with some embodiments.

FIG. 2 provides an exemplary architecture for the modules in the data processing system 100 of FIG. 1. More specifically, FIG. 2 illustrates a data processing system 100 with AI one more data processing modules 202 and one or more data analytics modules 204.

The AI data processing module(s) 202 include one or more audit interfaces 210 and one or more machine learning algorithm(s) 212. The AI data processing module(s) 202 receives or ingests unstructured rate filing documents 206. Structured rate filing documents 206 may be, for example, publicly available regulatory filings filed by insurance carrier with a state Department of Insurance. Such publicly available regulatory filings may include tables housing rate factors and rating algorithms in an unstructured data format.

In some approaches, the AI data processing module(s) 202 further optionally receives or ingests semi-structured documents 208.

The AI data processing module(s) 202 includes one or more machine learning algorithms 212 configured to analyze the unstructured rate filing documents 206. In particular, the machine learning algorithm(s) 212 analyze the unstructured rate filing documents 206 to detect tables. The machine learning algorithm(s) 212 further extract rate factor data 213 and place the extracted rate factor 213 data into structured form. In this manner, the machine learning algorithm(s) generate structured rate factor data 214. In addition to extracting rate factor data 213, the machine learning algorithm(s) 212 may also extract one or more of metadata and rating algorithms from the unstructured rate filing documents 206. In some approaches, the machine learning algorithm(s) 212 use language-based models to extract table metadata such as the specific names of tables.

In some aspects, the AI data processing module(s) 202 further includes one or more machine learning algorithms configured to analyze the semi-structured documents 208. For example, the AI data processing module(s) 202 may further include one or more machine learning algorithms configured to extract data from the semi-structured documents and place the extracted data into a structured form.

In some approaches, the machine learning algorithm(s) 212 include at least one of a faster RCNN algorithm and a layout LM algorithm, though, it is contemplated that any suitable machine learning algorithm or model may be employed. In some examples, the faster RCNN algorithm detects and localizes tables in the unstructured rate filing documents 206. The machine learning algorithm(s) 212 may include an algorithm, such as the layout LM algorithm, that indexes the unstructured rate filing documents 206. For example, such an algorithm extracts the name of an entity (such as an insurance provider, etc.), a state, and/or a date of filing an associated with each unstructured rate filing document 206. The algorithm may then update database records, such as rate filing tables, to incorporate this information accordingly.

In some approaches, the machine learning algorithm(s) 212 is trained to detect tables in the unstructured rate filing documents 206. The machine learning algorithm(s) may be trained to detect tables in unstructured documents using a reference unstructured document database. The reference unstructured document database includes a plurality of unstructured documents each having at least one table therein.

In some approaches, the machine learning algorithm(s) 212 is also trained to extract rate factor data 213 from the unstructured rate filing documents 206. The machine learning algorithm(s) 212 may be trained to extract information from detected tables using the reference unstructured document database. The reference unstructured document database further includes information and/or data associated with the tables included in the plurality of unstructured documents. In particular, in some approaches, the reference unstructured document database includes a plurality of unstructured rate filing documents and rate factor information and/or data associated with tables in the unstructured rate filing documents. In this manner, the data housed in the unstructured document database may be used to train the machine learning algorithm(s) 212.

In some approaches, the machine learning algorithm(s) 212 may be trained to detect tables using a dataset including annotated data such as plurality of annotated unstructured rate filing documents. For example, several hundred pages of annotated unstructured rate filing documents may be used to train the machine learning algorithm(s) 212. The annotated unstructured rate filing documents may include annotations such as bounding boxes around the tables, captions, headers, or other suitable labels. The dataset may be split into training sets and test sets. In some approaches, the training sets and the test sets may come from different unstructured rate filing documents to ensure generalizability. The training sets may then be used to train the machine learning algorithms(s) 212 while the test sets are used to test the trained machine learning algorithm(s) 212.

To improve the accuracy of table detection and/or data extraction, the training data in the reference unstructured document database may be divided into subsets and labeled. For example, data may be divided based on a particular company, a particular group of companies, a particular market, and/or the data source or subject matter of the unstructured data. In this manner, a subset of training data may include reference unstructured documents that are analogous to a target document or group of documents to be analyzed by the machine learning algorithm(s) 212. For example, when the unstructured rate filing documents are publicly available regulatory filings, the training data sets may be evaluated to determine which sets are analogous to filings for a particular insurance provider's regulatory filings. It is also contemplated that different machine learning algorithms 212 may be trained with different training data sets and, in this manner, different machine learning algorithms 212 may be developed and used based on the source of the unstructured documents to be analyzed by the AI data processing module 202. For example, different machine learning algorithms 212 may be developed for a particular company, group of companies, and/or market. It is contemplated that fine-tuning the machine learning algorithms 212 in this manner may improve the algorithms performance, in particular, by improving the average precision of the algorithm and by reducing the mean recall.

In some approaches, unsupervised domain adaptation may be used to adapt an existing trained machine learning algorithm(s) 212 to a new domain such as a new company, group of companies, and/or market. Domain adaptation may be used to adapt an existing machine learning algorithm to focus on domain-independent features to provide regularization between an original or source domain (e.g., including annotated documents from an original training set) and the new domain (e.g., including documents from a new domain such as a new company). In particular, domain adaptation may be used to balance the performance of the machine learning algorithms on annotated training data, while trying to align the features between annotated and non-annotated data. In some aspects, a two-step approach may be employed that involves unsupervised domain adaptation with supervised fine-tuning to allow the machine learning algorithms 212 to reach fine-tuned performance of base models with fewer labeled examples in a training data set.

The audit interface 210 is configured to display the structured rate factor data 214 obtained using the AI data processing module(s) 202 and to receive at least one change to the structured rate factor data 214. The audit interface is also be configured to display the original unstructured rate filing documents 206. In this manner, a user may compare the structured rate factor data 214 to data in the original unstructured rate filing documents 206. In some approaches, the structured rate factor data 214 is housed in one or more databases and the audit interface 210 facilitates the verification of data in such databases. For example, a user may compare rate factors present in the original structured rate filing documents 206 to the structured rate factor data 214 housed in the database. When a user detects a discrepancy, the user may make changes to the structured rate factor data 214 via the audit interface 210. The audit interface 210 may then update the structured rate factor data 214 to reflect the change and update the database. While the audit interface is configured to receive one or more changes to the structured rate factor data 214, it is contemplated that in some instances it may receive no changes to the structured rate factor data 214.

In some approaches, the audit interface 210 is further configured to automatically validate the structured rate factor data 214 via one or more audit algorithms. For example, the audit interface 210 may incorporate an audit algorithm that automatically detects if a field or column of data is missing from the structured rate factor data 214. Further, in some approaches, the audit interface 210 may include one or more algorithms to automatically detect and/or correct anomalous data, such as potentially erroneous data. In this manner, the audit interface 210 may provide automatic supervision of the data extraction and structuring processes described herein.

Further, in some aspects, the audit interface 210 may be configured to automatically identify trends in the structured rate factor data 214 and/or to identify anomalies or changes in the structured rate factor data 214. Identified trends, anomalies, and/or changes may be presented to a user, for example displayed via a user interface associated with the audit interface 210.

In operation, the AI data processing module(s) 202 receives a plurality of unstructured rate filing documents 206. The machine learning algorithms 212 detect one or more tables in the unstructured rate filing documents 206 and extract rate factor data 213. The machine learning algorithms 212 further place the extracted rate factor data 213 into structured form to generate structured rate factor data 214. The audit interface 210 then displays the structured rate factor data 214 via a user interface. In some aspects, the audit interface 210 also displays one or more of the unstructured rate filing documents 206. The audit interface 210 also receives one or more changes to the structured rate factor data 214 via the audit interface 210.

The data analytics module 204 facilitates access to and/or further analysis of the structured rate factor data 214. The data analytics module 204 includes various APIs to allow access to the extracted structured rate factor data 214, for example, by one or more workflows. As shown in FIG. 2, the data analytics module 204 includes a pricing/rating API 216, a marketing/sales API 218, and a management/strategy API 220.

In some embodiments, the data analytics module 204 is configured to calculate a competitive index (CI) based, at least in part, on the structured rate factor data 214. The competitive index is a ratio between two companies' pricing, for example, for like products in like markets. In this manner, the competitive index provides insight into the position of the companies' pricing against each other.

The rate factors and rating algorithms used by companies (e.g., two insurance providers) are used to calculate pricing premiums and, therefore, a competitive index. As discussed above, rate factors (e.g., structured rate factor data 214) and rating algorithms used by insurance companies may be obtained by the AI data processing module(s) 202. Pricing premiums are derived from the rate factors and rating algorithms, for example using a rating tool. In some approaches, the data analytics module(s) 204 further includes such a rating tool. The rating tool may use a company's rate factors and rating algorithms to produce, e.g., information on the company's policy premiums. In particular, in one example, the rating tool may run a particular insurance carrier's historical policy data through a company's rating algorithm to produce an overview of the company's policy premiums.

Table 1 provides an exemplary competitive index calculation. As shown in Table 1, to calculate the competitive index for Company 1 as compared to Company 2, the policy premium for Company 1 is in the numerator and the policy premium for Company 2 is in the denominator of the ratio. When the policy premiums for a like policy are $1,100 for Company 1 and $1,000 for Company 2, the competitive index is 1.1. A competitive index of 1.1 indicates that Company 1's policy premiums are higher by 0.1 (10%) as compared to Company 2. When policy premiums are the same, the competitive index is 1.0, which means the companies are at parity and neither company carries a price advantage.

TABLE 1

| | Policy Premium |
|---|---|
| Company 1 | $1,100 |
| Company 2 | $1,000 |

CI = (Company 1 Policy Premium)/(Company 2 Policy Premium) = (1,100)/(1,000) = 1.1.

In operation, the data analytics module 204 may receive structured rate factor data 214 from the AI data processing module(s) 202. In some approaches, the data analytics module 204 queries one or more databases that house the structured rate factor data 214 to retrieve the structured rate factor data 214. The structured rate factor data 214 may then be exported into an automated workflow, for example, in one or more of the pricing/rating API 216, the marketing/sales API 218, and the management/strategy API 220. In this manner, the architecture shown in FIG. 2 may be employed to analyze pricing, to analyze underwriting polices, for marketing (for example, to allocate capital for better marketing results), and/or to focus sales efforts.

In some approaches, one or more questions and/or data queries may be posed about an unstructured document such as a publicly available regulatory filing via the data analytics module 204. In response to the questions and/or queries, the data analytics module 204 then display and/or export the salient information.

In operation, the pricing/rating API 216 may receive structured rate factor data 214 and simulate pricing based on the structured rate factor data 214. In particular, the pricing/rating API 216 may include a rating tool to derive a company's pricing and calculate various competitive indices. In this manner, the pricing/rating API 216 may facilitate pricing optimization for a particular insurance carrier by facilitating this benchmarking analysis. The pricing/rating API 216 may organize and/or analyze structured rate factor data 214 on a state-by-state or, in some approaches, on a market-by-market analysis to help an insurance carrier evaluate in which states and/or markets in which it would be successful.

While the exemplary architecture shown in FIG. 2 is shown and described as processing rate filing document(s) 206, which for example house rate factor tables, it is also contemplated that the architecture may be leveraged to process other unstructured documents, which may house other data tables. Accordingly, the architecture described in FIG. 2 could be used to execute one or more of the methods described herein (e.g., methods 400-700) in order to process any form of unstructured document housing data table(s). For example, in some approaches, the architecture of FIG. 2 may be applied to process unstructured documents housing underwriting tier tables. In such an approach, the architecture depicted in FIG. 2 could be used to detect underwriting tier tables in the unstructured documents, to extract structured underwriting tier data from the underwriting tier tables, and to place the extracted underwriting tier data into structured form, making it accessible via one or more APIs.

In an exemplary embodiment, the AI data processing module(s) 202 receives a plurality of unstructured documents housing underwriting tier tables. The machine learning algorithm(s) 212 detect one or more tables in the unstructured documents and extract underwriting tier data. The machine learning algorithm(s) 212 further place the extracted rate factor data 213 into structured form to generate structured underwriting tier data. The audit interface 210 then displays the structured underwriting data 214 via a user interface. In some aspects, the audit interface 210 also displays one or more of the original unstructured documents housing underwriting tier tables. The audit interface 210 may also receive one or more changes to the structured underwriting tier data via the audit interface 210.

In such an exemplary embodiment, the data analytics module 204 may receive the structured underwriting tier data from the AI data processing module(s) 202. The data analytics module 204 may query one or more databases that house the structured underwriting tier data to retrieve the structured underwriting tier data. The structured underwriting tier data may then be exported into an automated workflow, for example, in one or more APIs. The APIs may, for example, perform further analysis of the structured underwriting tier data, for example, to benchmark one company's underwriting tiers against industry standards, other markets, or other companies.

FIG. 3 is a schematic diagram of exemplary database(s) 300. The database(s) 300 house rate factor data 302, other regulatory filing data 304, metadata 306, and/or historical data 308. Rate factor data 302 may include structure rate factor data that has been obtained from an unstructured regulatory filing document according to the methods described herein. Other regulatory filing data 304 may include data related to rating algorithms, profit provisions, indicated and selected rate changes, effective dates, lists of changes, indications information, and loss information. The metadata 306 may include a location, a company name, a business line, a date, or any other forms of metadata associated with an unstructured rate filing document. The metadata 306 may also include table metadata such as names, titles, headers, captions, or other labels associated with a table. In some approaches, one or more of the other regulatory filing data 304 and the metadata 306 are also extracted from unstructured publicly available regulatory filing documents according to the methods described herein.

It is contemplated that the database(s) 300 may house historical data 308 in addition to current data obtained from unstructured rate filing documents. In this manner, the databases 300 may both store data newly obtained as recent rate filing documents are filed and historical data obtained from previously filed rate filing documents.

Figure 4:
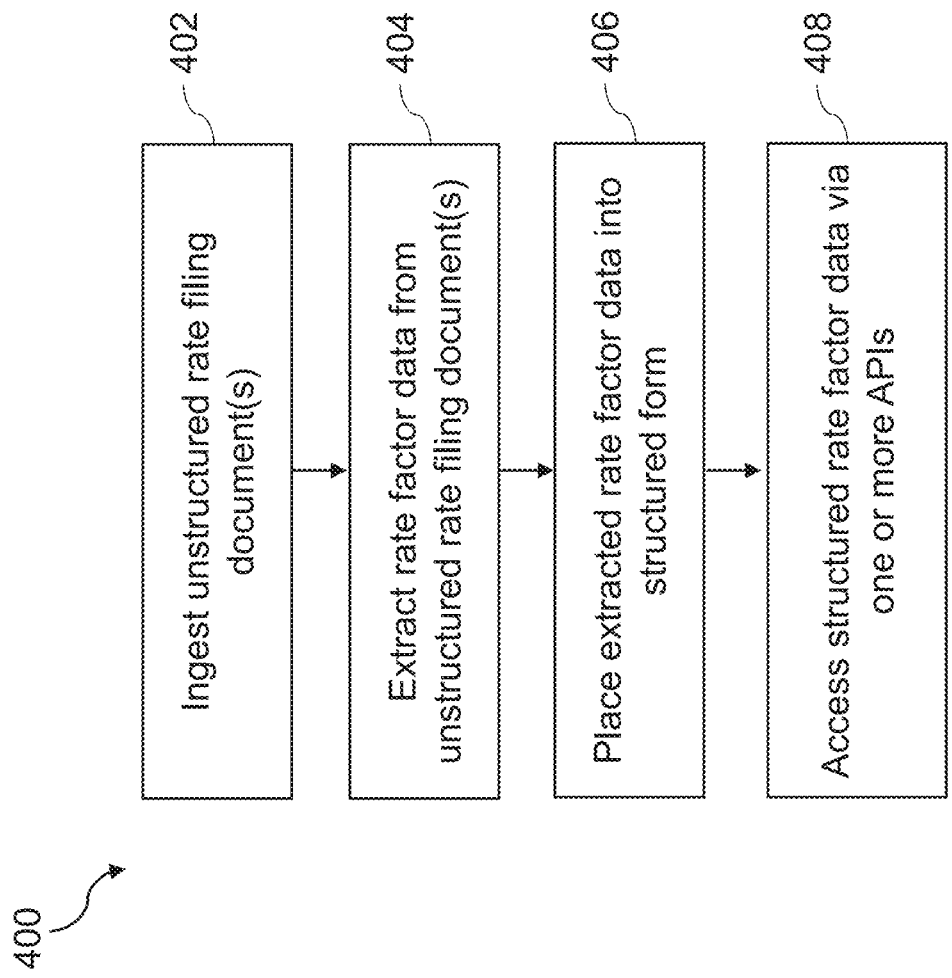
FIG. 4 is a flowchart illustrating a data processing method, in accordance with some embodiments.

FIG. 4 illustrates a data processing method 400. In some embodiments, the data processing method 400 is executed by the data processing system 100 depicted in FIG. 1. The data processing method 400 is a high-level method of processing unstructured rate filing documents.

The data processing method 400 includes receiving or ingesting 402 one or more unstructured documents. The unstructured rate filing documents 402, for example, may be publicly available regulatory filing documents filed with a Department of Insurance. However, it is contemplated that other unstructured and/or semi-structured documents may be received or ingested at step 402. The data processing method 400 also includes extracting 404 rate factor data from the unstructured rate filing documents. At step 404, other types of data such as metadata associated with the unstructured rate filing documents, rating algorithms, and other regulatory filing data may also be extracted. Further, one or more of the types of data described with reference to FIG. 3 may be extracted at step 404. The data processing method 400 also includes placing 406 the extracted rate factor data into structured form. Further, in some approaches, the data processing method 400 includes accessing 408 the structured rate factor data, any other types of extracted data, via one or more APIs, such as via one or more of the APIs described with reference to FIG. 2.

Figure 5:
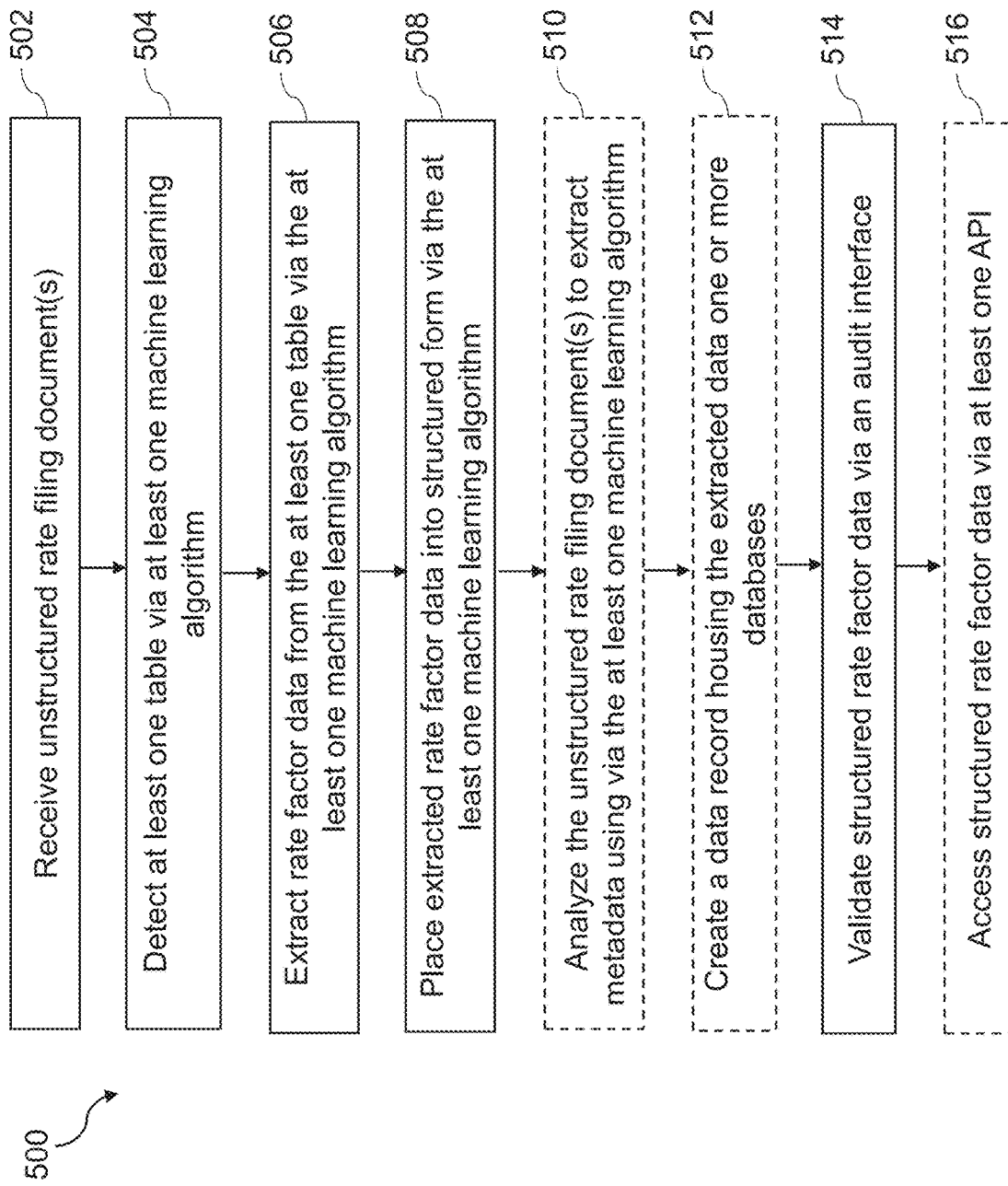
FIG. 5 is a flowchart illustrating a data processing method, in accordance with some embodiments.

FIG. 5 illustrates another data processing method 500. In some embodiments, the data processing method 500 is executed by the data processing system 100 depicted in FIG. 1.

The data processing method 500 includes receiving 502 unstructured rate filing documents. In some aspects, the data processing method 500 optionally first detects a set of candidate pages in the unstructured rate filing documents, the candidate pages being pages that may have tables. To detect the set of candidate pages, text from each page in the unstructured rate filing document may be extracted, for example via parsing or optical character recognition (OCR). One or more table names of interest associated with the unstructured rate filing documents may be received, for example via selection or input made via a user interface. The table names of interest are then matched against the text from each page. Pages where one or more matches occur with the table name of interest are then grouped into the set of candidate pages. The set of candidate pages is then analyzed according to step 504. It is contemplated that this candidate pages selection process may reduce computation demands and costs for executing the data processing method 500.

The data processing method 504 also includes detecting 504 at least one table in the unstructured rate filing documents (or in some approaches, the set of candidate pages) via at least one machine learning algorithm. The data processing method then includes extracting 506 rate factor data from the at least one table via the at least one machine learning algorithm, such as the machine learning algorithm 212 described with reference to FIG. 2. The data processing method also includes placing 508 the extracted rate factor data into structured form via at least one machine learning algorithm to generate structured rate factor data.

In some approaches, the data processing method 500 optionally includes analyzing 510 the unstructured rate filing documents to extract metadata associated with the unstructured rate filing documents, such as document metadata or table metadata. The step of analyzing 510 may be performed via at least one machine learning algorithm, such as the machine learning algorithm 212 described with reference to FIG. 2.

The data processing method 500 may also optionally include creating 512 a data record housing the structured rate factor data in one or more databases. For example, step 512 may include creating a data record in the databases 300 depicted in FIG. 3. The data record may also house extracted metadata.

Figure 6:
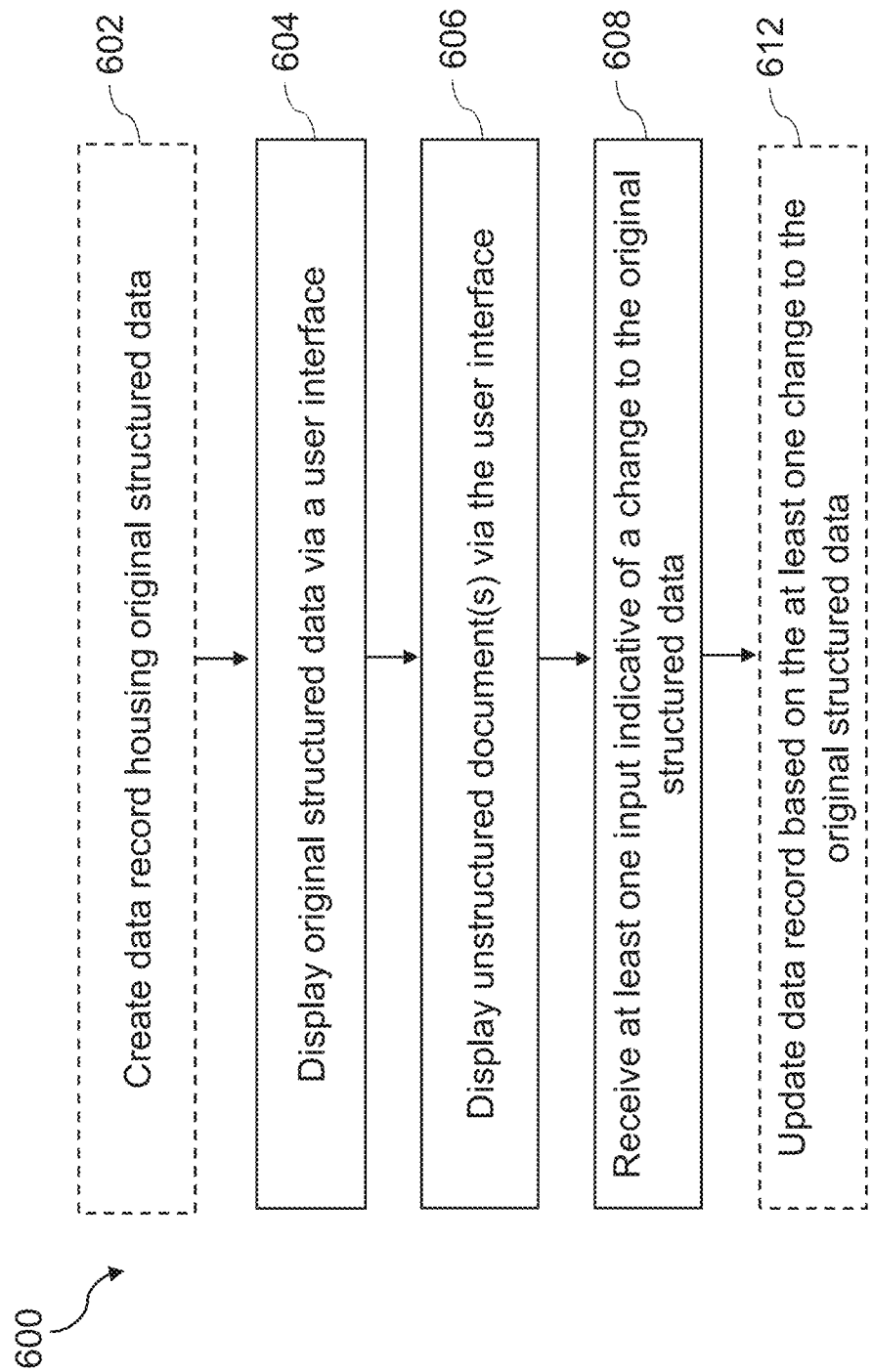
FIG. 6 is a flowchart illustrating a data validation method, in accordance with some embodiments.

The data processing method 500 also includes validating 514 the structured rate factor data via an audit interface. Validating 514 the structured rate factor data may include receiving one or more changes to the structured rate factor data via an audit interface. For example, in some approaches, the audit interface may provide or otherwise display to a user the structured rate factor data in an editable format. In this manner, a user may make changes to the structured rate factor data via the audit interface and data validation occurs via user inputs to the audit interface. In some approaches, step 514 is performed via the audit interface 210 described with reference to FIG. 2. FIG. 6 provides an exemplary data validation method 600 that may be employed at step 512.

In some embodiments, the data processing method 500 also includes accessing 516 the structured rate factor data via at least one API. In some approaches, step 514 may be performed via the data analytic module 204 described with reference to FIG. 2.

Further, in some embodiments, some of the unstructured rate filing documents received at step 502 may include a plurality of pages. Accordingly, the data processing method 500 may involve processing the plurality of pages in parallel. That is, data processing method 500 may execute one of more of the steps in FIG. 5 in parallel for at least some of the plurality of pages. In one example, the data processing method 500 may include the following steps, performed in parallel, for at least some of the plurality of pages present in the unstructured rate filing documents: detecting 504 at least one table on each page, extracting 506 rate factor data from the at least one table, placing 508 extracted rate factor data into structured form, and/or analyzing 510 each page to extract metadata. That is, steps 504-510 may be carried out in parallel for each or at least some of the plurality of pages present in the unstructured rate filing documents. It is contemplated that such parallel processing may expedite the data processing method 500 and reduce processing time. In this manner, the method may process thousands of pages from unstructured rate filing documents simultaneously, for example via a cloud-based system.

FIG. 6 illustrates a data validation method 600. In some embodiments, the data validation method 600 is executed by the data processing system 100 described with reference to FIG. 1. The data validation method 600 may be used to ensure the accuracy of structured data, such as structured rate factor data, metadata, other regulatory filing data, obtained via the methods described herein. The original structured data validated using data validation method 600 may include structured data obtained via anyone of the methods described herein.

The data validation method 600 optionally includes creating 602 a data record housing original structured data. The data record may include one or more of the types of structured data types described herein, including structured rate factor data, metadata associated with unstructured documents, and/or any other regulatory filing data. Further, it is contemplated that the original structured data may have been obtained from at least one unstructured document, such as an unstructured rate filing document, via one or more of the data processing methods described herein.

Figure 9:
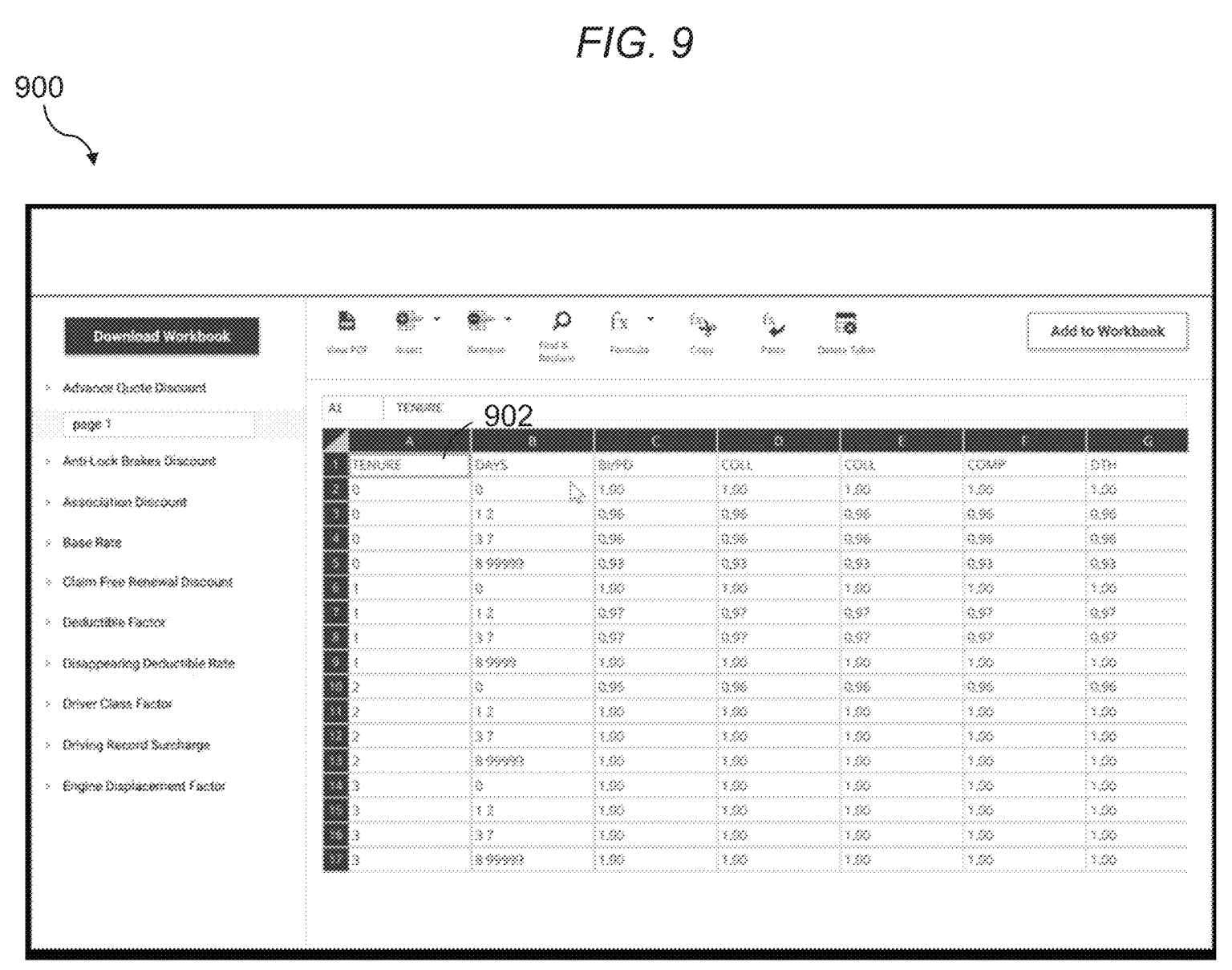

The data validation method 600 includes displaying 604 the original extracted structured data via a user interface, such as the user interface 900 illustrated in FIG. 9. In this manner, a user may view the original structured data via the user interface and inspect the original structured data for errors.

The data validation method 600 also includes displaying 606 at least one unstructured document via the user interface. The unstructured document may be the document from which the original structured data in step 606 was extracted. In some approaches, the unstructured document and the original structured data are both displayed via the user interface, for example at the same time and/or positioned adjacent to each other, so that a user may compare the content in the unstructured document to the original structured data. By displaying both the unstructured document and the original structured data, a user is able to review the content of the original extracted structured data for accuracy.

The data validation method 600 further includes receiving 608 at least one input indicative of a change to the original structured data. In some approaches, the at least one input indicative of the change is received via the user interface. For example, a user may enter a change to the original structured data via the user interface. In this manner, a user is able to validate the results of the process of extracting data from unstructured documents and placing such extracted data into structured form.

Further, the data validation method 600 may also optionally include updating 612 the data record based on the at least one change to the original structured data. Thus, the data record is updated to reflect changes made during data validation. In some embodiments, the updated data record, which includes the at least one change to the original structured data, is used to refine at least one machine learning algorithm (e.g., machine learning algorithm 212 in FIG. 2). For example, the updated data record may be used to update the machine learning algorithm that is used to extract the data and place the extracted data into structured form. For example, the updated data record may be used as part of a reference data set that is used to train the machine learning algorithm. In some approaches, the updated data record may be saved to the reference database that is described with reference to FIG. 2.

Figure 7:
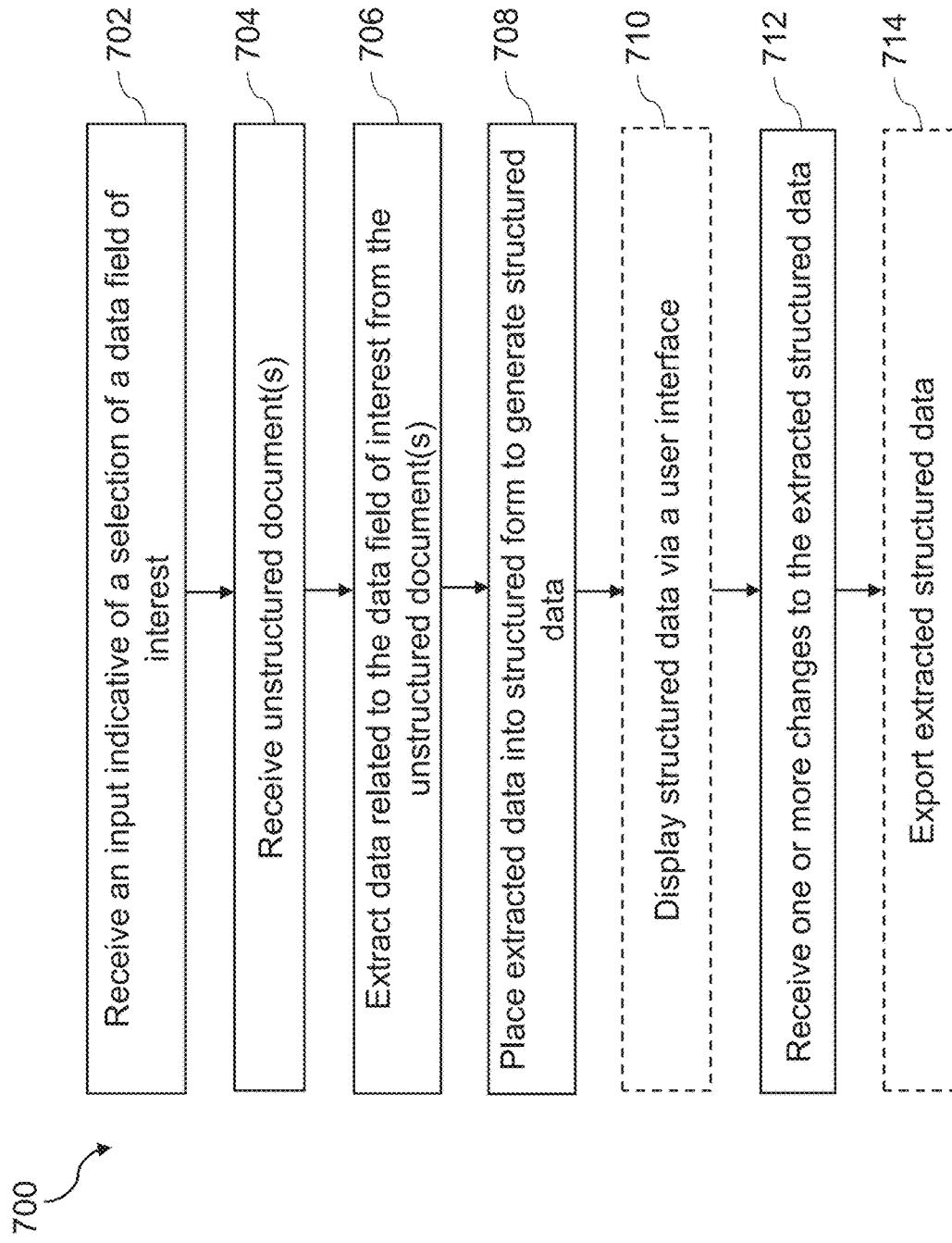
FIG. 7 is a flowchart illustrating a data processing method, in accordance with some embodiments.

FIG. 7 illustrates a data processing method 700. In some embodiments, the data processing method 700 is executed by the data processing system 100 depicted in FIG. 1. Further, in some approaches, the data processing method 700 is performed via the user interface 800 illustrated in FIG. 8. The data processing method 700 may be used to receive or ingest unstructured documents and to validate structured data that is obtained from the unstructured documents. Further, the data processing method 700 may be used to extract data related to a particular field of interest from the unstructured documents.

The data processing method 700 includes receiving 702 an input indicative of a selection of a data field of interest. In some approaches, the input indicative of the selection may be received via a user interface. For example, at step 702 a user may select a particular rate factor list to extract from an unstructured rate filing document via a user interface. In this manner, subsequent data extraction may focus on the selected data field of interest.

The data processing method 700 also includes receiving 704 at least one unstructured document. In some approaches, step 704 is performed via a user interface. For example, a user may upload the at least one unstructured document via the user interface. It is also contemplated that unstructured documents may be automatically received, for example, via the unstructured document collection module 108 described with reference to FIG. 1.

The data processing method 700 further includes extracting 706 data related to the data field of interest from the at least one unstructured document. The data processing method 700 also includes placing 708 the extracted data into structured form to generate structured data. Step 706 and 708 may be automatically performed via one or more machine learning algorithms, such as the machine learning algorithms 212 described with reference to FIG. 2.

In some embodiments, the data processing method 700 then optionally includes displaying 710 the structured data via a user interface. The data processing method 700 then includes receiving 712 one or more changes to the structured data via the user interface. Step 712 may include one or more steps in the data validation method 600 described with reference to FIG. 6.

Further, in some embodiments, the data processing method 700 optionally includes exporting 714 the structured data. In some approaches, a user may export the structured data via user interface. In other approaches, the structured data may be exported to one or more APIs, such as the APIs described with reference to FIG. 2.

Figure 8:
FIG. 8 illustrates an exemplary user interface of the data processing system of FIG. 1, in accordance with some embodiments.

FIG. 8 is an exemplary user interface 800 of the data processing system 100 in FIG. 1. The user interface 800 includes a data selection field 802. The data selection field 802 a user to select at least one field of interest for data extraction. While shown as a drop-down list in FIG. 8, it is contemplated that the data selection field 802 may be any suitable data entry field such as a check box, a text entry field, etc. In some approaches, the data selection field 802 may allow a use to select a particular table of interest to be identified in an unstructured document. Accordingly, data related to the selected field of interest may be extracted from the at least one unstructured document. The user interface 800 also includes a document upload field 804. The document upload field 804 allows a user to upload at least one unstructured document to the data processing system 100. Once an unstructured document is uploaded, the system 100 then extracts data from the at least one unstructured document that is uploaded via the document upload field 804 and places the extracted data into structured form. In particular, the system 100 extracts data relating to the selected field of interest.

FIG. 9 is another exemplary user interface 900 of the data processing system 100 in FIG. 1. In some approaches, the user interface 900 may be used to perform the data validation method 600. The user interface 900 displays structured data that has been obtained via one or more of the methods described herein. The user interface 900 includes at least one editable field 902. In particular, the at least one editable field 902 includes the structured data that has been obtained via one or more of the methods described herein. In this manner, a user may enter a change to the structured data via the at least one editable field 902.

Figure 10:
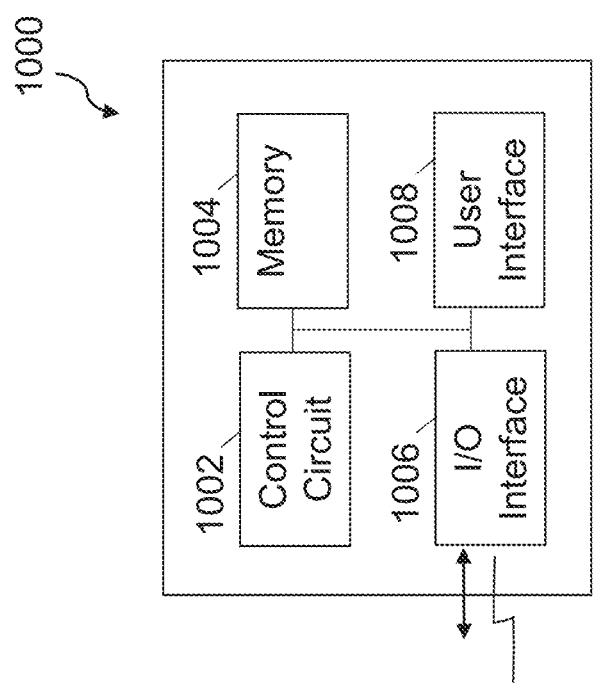
FIG. 10 illustrates an exemplary system for use in implementing systems, apparatuses, devices, methods, techniques, and the like for processing data for insurance pricing, in accordance with some embodiments.

The methods, techniques, systems, devices, services, servers, sources and the like described herein may be utilized, implemented and/or run on many different types of devices and/or systems. Referring to FIG. 10, there is illustrated a system 1000 that may be used for any such implementations, in accordance with some embodiments. One or more components of the system 1000 may be used to implement any system, apparatus or device mentioned above, or parts of such systems, apparatuses or devices, such as for example any of the above or below mentioned control circuits, electronic user devices, sensor(s), databases, parts thereof, and the like. However, the use of the system 1000 or any portion thereof is, certainly not required.

By way of example, the system 1000 may include one or more control circuits 1002, memory 1004, input/output (I/O) interface 1006, and/or user interface 1008. The control circuit 1002 typically comprises one or more processors and/or microprocessors. The memory 1004 stores the operational code or set of instructions that is executed by the control circuit 1002 and/or processor to implement the functionality of the systems and devices described herein, parts thereof, and the like. In some embodiments, the memory 1004 may also store some or all of particular data that may be needed to assist with collecting and processing data to assist with one or more insurance-related tasks.

It is understood that the control circuit 1002 and/or processor may be implemented as one or more processor devices as are well known in the art. Similarly, the memory 1004 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 1004 is shown as internal to the system 1000; however, the memory 1004 can be internal, external or a combination of internal and external memory. The system 1000 also may include a database (not shown in FIG. 10) as internal, external, or a combination of internal and external to the system 1000. Additionally, the system typically includes a power supply (not shown), which may be rechargeable, and/or it may receive power from an external source. While FIG. 10 illustrates the various components being coupled together via a bus, it is understood that the various components may actually be coupled to the control circuit 110 and/or one or more other components directly.

Generally, the control circuit 1002 and/or electronic components of the system 1000 can comprise fixed-purpose hard-wired platforms or can comprise a partially or wholly programmable platform. These architectural options are well known and understood in the art and require no further description here. The system and/or control circuit 1002 can be configured (for example, by using corresponding programming as will be well understood by those skilled in the art) to carry out one or more of the steps, actions, and/or functions described herein. In some implementations, the control circuit 1002 and the memory 1004 may be integrated together, such as in a microcontroller, application specification integrated circuit, field programmable gate array or other such device, or may be separate devices coupled together.

The I/O interface 1006 allows wired and/or wireless communication coupling of the system 1000 to external components and/or or systems. Typically, the I/O interface 1006 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 1008 may be used for user input and/or output display. For example, the user interface 1008 may include any known input devices, such one or more buttons, knobs, selectors, switches, keys, touch input surfaces, audio input, and/or displays, etc. Additionally, the user interface 1008 include one or more output display devices, such as lights, visual indicators, display screens, etc. to convey information to a user, such as but not limited to communication information, instructions regarding unloading of the delivery vehicle, status information, order information, delivery information, notifications, errors, conditions, and/or other such information. Similarly, the user interface 1008 in some embodiments may include audio systems that can receive audio commands or requests verbally issued by a user, and/or output audio content, alerts and the like.

It is contemplated that the data processing systems and methods described herein may be applied to any form of unstructured insurance filing data and/or documents. For example, the data processing systems and methods may be used to process unstructured data and/or documents related to insurance pricing, underwriting, marketing, and/or sales. In this manner, the systems and methods may be employed to analyze pricing, to analyze underwriting polices, for marketing (for example, to allocate capital for better marketing results), and/or to focus sales efforts.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A data processing method, comprising:
receiving a plurality of unstructured documents, the plurality of unstructured documents including at least one table related to insurance rate factors;
detecting at least one table in the plurality of unstructured documents via at least one machine learning algorithm;
automatically extracting rate factor data from the at least one table via the at least one machine learning algorithm;
placing the extracted rate factor data into structured form to create structured rate factor data; and
displaying an audit interface via at least one user interface, the audit interface being configured to receive one or more changes to the structured rate factor data.

2. The method of claim 1 wherein at least one of the plurality of unstructured documents is a regulatory filing document.

3. The method of claim 1, further comprising:
accessing the structured rate factor data via at least one application programming interface.

4. The method of claim 3 wherein the at least one application program interface calculates a competitive index based, at least in part, on the structured rate factor data.

5. The method of claim 1, further comprising:
analyzing the plurality of unstructured documents via the at least one machine learning algorithm to extract metadata associated with at least one of the plurality of unstructured documents.

6. The method of claim 5 wherein the metadata includes at least one of a location, a company name, a business line, and a date associated with at least one of the plurality of unstructured documents.

7. The method of claim 1, further comprising:
validating the structured rate factor data by receiving at least one change to the structured rate factor data via the audit interface.

8. The method of claim 7 wherein validating the structured rate factor data comprises:
displaying the structured rate factor data via a user interface;
displaying at least one of the plurality of unstructured documents via the user interface; and
receiving at least one input indicative of a change to the structured rate factor data.

9. The method of claim 8, further comprising:
creating at least one data record housing the structured rate factor data; and
updating the data record based on the at least one change to the structured rate factor data.

10. The method of claim 9, further comprising:
refining the at least one machine learning algorithm based on the updated data record.

11. The method of claim 1 wherein the machine learning algorithm is trained to detect tables in unstructured documents using a reference unstructured document database, the reference unstructured document database including a plurality of unstructured documents each having at least one table therein.

12. The method of claim 11 wherein the machine learning algorithm is further trained to extract information from tables using the reference unstructured document database, wherein the reference unstructured document database further includes information associated with the at least one table included in each of the plurality of unstructured documents.

13. The method of claim 1 wherein the machine learning algorithm includes at least one of a faster RCNN algorithm and a layout LM algorithm.

14. A data processing method, comprising:
receiving a plurality of unstructured rate filing documents, the plurality of unstructured rate filing documents including a plurality of tables related to insurance rate factors;
detecting at least some of the plurality of tables in the plurality of unstructured documents via at least one machine learning algorithm;
automatically extracting rate factor data from the at least some of the plurality of tables via the at least one machine learning algorithm;
placing the extracted rate factor data into structured form to create structured rate factor data;
displaying an audit interface via at least one user interface, the audit interface being configured to receive one or more changes to the structured rate factor data; and
analyzing the structured rate factor data to assess insurance pricing.

15. The method of claim 14 wherein receiving a plurality of unstructured rate filing documents includes:
automatically accessing at least one webpage and downloading the at least one unstructured rate filing document from the at least one webpage.

16. The method of claim 14 wherein the method further includes:
indexing the plurality of unstructured documents via the at least one machine learning algorithm.

17. The method of claim 14, further comprising:
receiving an input indicative of a selection of at least one data field in the plurality of unstructured rate filing documents; and
extracting rate factor data related to the at least one data field from the plurality of tables via the at least one machine learning algorithm.

18. A data processing system comprising:
at least one data processing module including at least one machine algorithm, the at least one machine learning algorithm configured to extract factor tables from unstructured data;
at least one user interface configured to display at least one of the extracted rate factor tables or portions thereof; and
a processor in communication with the at least one data processing module, the processor configured to:
receive a plurality of unstructured rate filing documents, the plurality of unstructured rate filing documents including a plurality of tables related to insurance rate factors;
detect at least some of the plurality of tables in the plurality of unstructured documents via at least one machine learning algorithm;
automatically extract rate factor data from the at least some of the plurality of tables;
place the extracted rate factor data into structured form to create structured rate factor data;
display an audit interface via the at least one user interface, the audit interface being configured to receive one or more changes to the structured rate factor data; and
analyze the extracted structured rate factor data to assess insurance pricing.

19. The data processing system of claim 18 further comprising at least one unstructured document collection module configured to automatically download the at least one unstructured rate filing document from at least one webpage.

20. The data processing system of claim 18 wherein the at least one machine learning algorithm is further configured to extract at least one of metadata or rate filing data associated with the unstructured rate filing document.

21. The data processing system of claim 18, wherein at least some of the plurality of unstructured documents include a plurality of pages, and wherein the processor is further configured to process at least some the plurality of pages in parallel.

22. The data processing system of claim 21, wherein to process at least some of the plurality of pages in parallel, the processor is configured to carry out the following steps in parallel for at least some of the plurality of pages:
detect at least some of the plurality of tables on a page in the plurality of pages;
automatically extract rate factor data from the at least some of the plurality of tables; and
place the extracted rate factor data into structured form to create structured rate factor data.

* * * * *